(12) United States Patent
Jiang et al.

(10) Patent No.: US 7,535,703 B2
(45) Date of Patent: May 19, 2009

(54) PUSHING ASSEMBLY FOR ELECTRONIC MODULE

(75) Inventors: Xiao-Gang Jiang, Shenzhen (CN); Hung-Chun Lu, Tu-Cheng (TW); Chien-Li Tsai, Tu-Cheng (TW); Wen-Kang Lo, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 237 days.

(21) Appl. No.: 11/487,560

(22) Filed: Jul. 14, 2006

(65) Prior Publication Data
US 2007/0014088 A1 Jan. 18, 2007

(30) Foreign Application Priority Data
Jul. 15, 2005 (CN) .................... 2005 2 0061659 U

(51) Int. Cl.
*H05K 5/00* (2006.01)
*H05K 7/00* (2006.01)
*G06F 1/16* (2006.01)

(52) U.S. Cl. ...................... 361/685; 361/683

(58) Field of Classification Search ................. 361/679, 361/683, 685, 686
See application file for complete search history.

(56) References Cited

U.S. PATENT DOCUMENTS

| 5,305,180 | A | * | 4/1994 | Mitchell et al. | 361/685 |
|---|---|---|---|---|---|
| 5,311,455 | A | * | 5/1994 | Ho | 361/685 |
| 5,452,179 | A | * | 9/1995 | Sasaki | 361/685 |
| 5,740,012 | A | * | 4/1998 | Choi | 361/686 |
| 5,825,616 | A | * | 10/1998 | Howell et al. | 361/684 |
| 6,069,790 | A | * | 5/2000 | Howell et al. | 361/686 |
| 6,086,394 | A | * | 7/2000 | Tung | 439/159 |
| 6,185,103 | B1 | | 2/2001 | Yamada | |
| 6,510,051 | B2 | * | 1/2003 | Kim | 361/686 |
| 6,992,886 | B2 | * | 1/2006 | Salinas et al. | 361/685 |
| 7,009,836 | B2 | | 3/2006 | Lo | |

FOREIGN PATENT DOCUMENTS
TW M221956 10/2004

* cited by examiner

*Primary Examiner*—Anatoly Vortman
*Assistant Examiner*—Quinn Hunter

(57) ABSTRACT

A pushing assembly is provided for pushing an electronic module out of a computer enclosure. The pushing assembly includes an installing portion, and a pushing member. The installing portion is arranged in the computer enclosure. The pushing portion is installed to the installing portion. The installing portion includes a manipulating section. The computer enclosure defined a slot. The manipulating section is received in the slot of the computer enclosure. The manipulating section is turned to rotate the pushing member and the pushing member pushes the electronic module to slide a certain distance to facilitate the electronic module being taken out from the computer enclosure.

15 Claims, 5 Drawing Sheets

PUSHING ASSEMBLY FOR ELECTRONIC MODULE

BACKGROUND OF THE INVENTION

1. Field of the Invention

The present invention relates to pushing assembly for electronic modules, and particularly to a pushing assembly for readily pushing an electronic module out of a computer enclosure.

2. General Background

The production of notebook computer has become mature and entered a meager profit era. Only cost down and bringing convenience to users can bring more competitive strength. Typically, electronic modules, such as hard disk drives (HDDs), and compact disk-read only memory (CD-ROM) drives, are attached to a bottom panel of a notebook computer enclosure. A connecter of an electronic module connects with a connecter of a motherboard in the notebook computer to exchange data. However, because the interior space of the notebook computer enclosure is very limited, some elements besides the electronic module must be detached in order to achieve operating space for pulling out the connecter of the electronic modules from the connecter of the motherboard. The process of detaching an electronic module is very inconvenient.

What is needed is a pushing assembly for readily pushing an electronic module out of a computer enclosure.

SUMMARY

In one preferred embodiment, a pushing assembly is provided for pushing an electronic module out of a computer enclosure. The pushing assembly includes an installing portion, and a pushing member. The installing portion is arranged in the computer enclosure. The pushing portion is installed to the installing portion. The installing portion includes a manipulating section. The computer enclosure defined a slot. The manipulating section is received in the slot of the computer enclosure. The manipulating section is turned to rotate the pushing member and the pushing member pushes the electronic module to slide a certain distance to facilitate the electronic module being taken out from the computer enclosure.

Other advantages and novel features will become more apparent from the following detailed description when taken in conjunction with the accompanying drawings, in which:

DETAILED DESCRIPTION OF THE EMBODIMENTS

Figure 1:
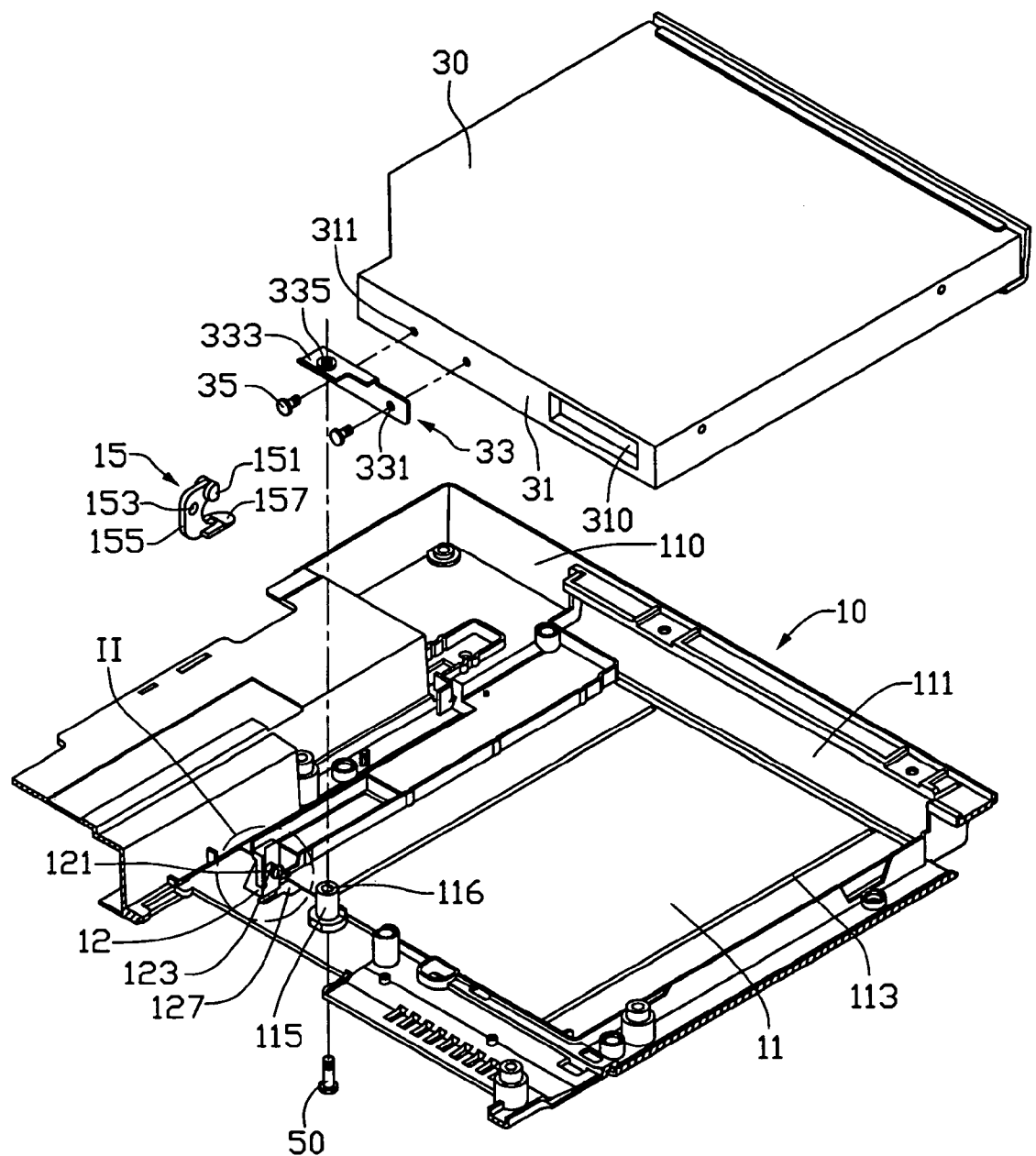
FIG. 1 is an exploded, isometric view of a pushing assembly in accordance with a preferred embodiment of the present invention, together with an electronic module, a mounting apparatus and a notebook computer enclosure.
Figure 2:
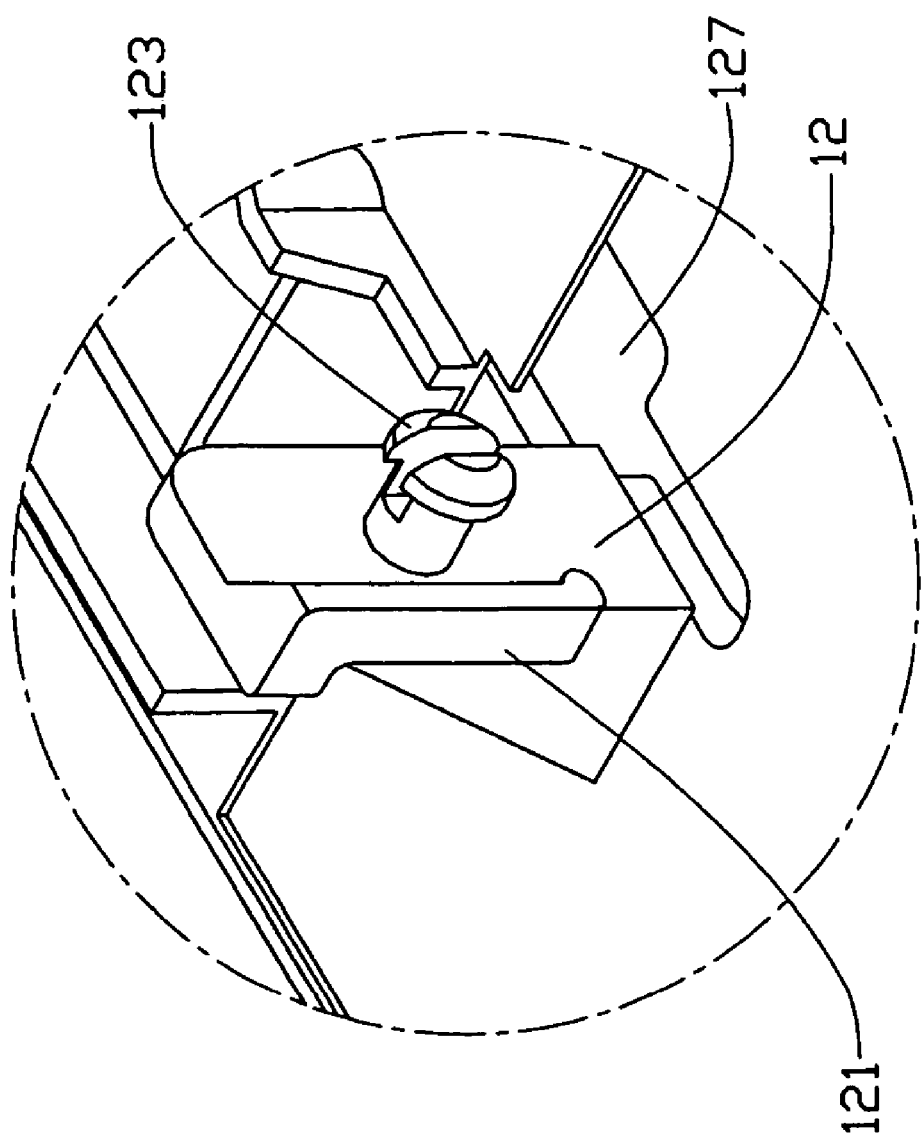
FIG. 2 is an enlarged view of part II of FIG. 1.

Referring to FIGS. 1 and 2, a pushing assembly in accordance with a preferred embodiment of the present invention is provided to push an electronic module 30 out of an enclosure 10 of an electronic device like a notebook computer. The electronic module 30 is a data storage device in this preferred embodiment. The notebook computer enclosure 10 includes a bottom panel 11 and a side panel 110. An opening 111 is defined in the side panel 110 for entry of the electronic module 30. A plurality of sliding rails 113 is formed on the bottom panel 11 to reduce friction when the electronic module 30 slides into or out of the notebook computer enclosure 10. A rear wall 31 of the electronic module 30 includes a connecter 310.

The electronic module 30 is attached to the notebook computer enclosure 10 by a mounting apparatus. The mounting apparatus includes a positioning post 115, a fixing plate 33 and a screw 50. The positioning post 115 protrudes from the bottom panel 11, and a round hole 116 is defined in the positioning post 115. A pair of through holes 331 is defined in the body of the fixing plate 33. A pair of threaded holes 311 is defined in the rear wall 31 of the electronic module 30. A pair of screws 35 extends through the through holes 331 then engages in the threaded holes 311 respectively, thus the fixing plate 33 is mounted to the rear wall 31 of the electronic module 30. The fixing plate 33 includes a bent portion 333 with a securing hole 335. The screw 50 extends through the round hole 116 of the positioning post 115 then engages in the securing hole 335 of the fixing plate 33, thus the electronic module 30 is attached to the notebook computer enclosure 10.

The pushing assembly includes an installing portion 12, and a pushing member 15.

The installing portion 12 is a block protruding from an inner side of the bottom panel 11 of the notebook computer enclosure 10. The installing portion 12 includes a resilient tab 121 and an installing post 123 defining an axis along its extending direction. The resilient tab 121 extends downward from a top of the installing portion 12. The installing post 123 protrudes form a side plane of the installing portion 12. A slot 127 is defined in the bottom panel 11 of the notebook computer enclosure 10 adjacent to the installing portion 12.

The pushing member 15 is similar to C-shaped. A pushing portion 151 is formed on an end of the pushing member 15. The pushing portion 151 is a block with a upright plane. An installing hole 153 is defined in the body of the pushing member 15 corresponding to the installing post 123 of the installing portion 12. A flange 155 of the pushing member 15 is flat corresponding to the resilient tab 121 of the installing portion 12. A manipulating section 157 is formed on the other end of the pushing member 15. The manipulating section 157 is U-shaped and includes a flat outer surface.

Figure 3:
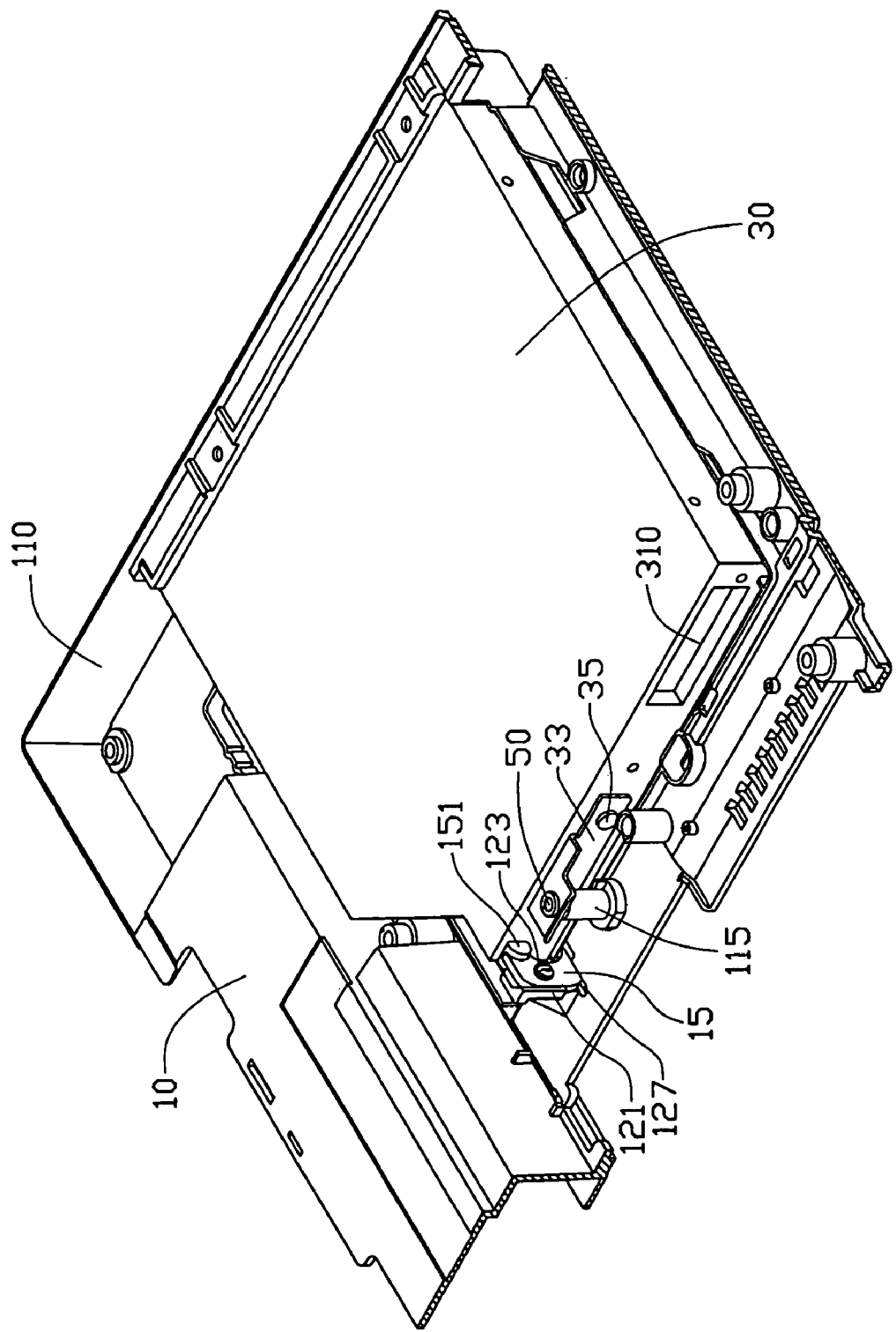
FIG. 3 is an assembled view of FIG. 1, showing the electronic module being locked.

Referring also to FIG. 3, in assembling the pushing assembly, the installing post 123 of the installing portion 12 extends through the installing hole 153 of the pushing member 15, and the pushing member 15 is pivotally installed to the bottom panel 11 of the notebook computer enclosure 10. The flange 155 of the pushing member 15 abuts against the resilient tab 121 of the installing portion 12. The manipulating section 157 of the pushing member 15 is received in the slot 127 of the bottom panel 11, and the outer surface of the manipulating section 157 is on a same plane with an outer surface of the bottom panel 11 of the notebook computer enclosure 10. The fixing plate 33 is mounted to the rear wall 31 of the electronic module 30 by the screws 35. The electronic module 30 is pushed into the notebook computer enclosure 10 from the opening 111. The connecter 310 connects with a connecter of a motherboard in the notebook computer enclosure 10. The screw 50 extends through the round hole 116 of the positioning post 115 then engages in the securing hole 335 of the fixing plate 33, thus the electronic module 30 is attached to the notebook computer enclosure 10. The pushing portion 151 of the pushing member 15 abuts against the rear wall 31 of the electronic module 30.

Figure 4:
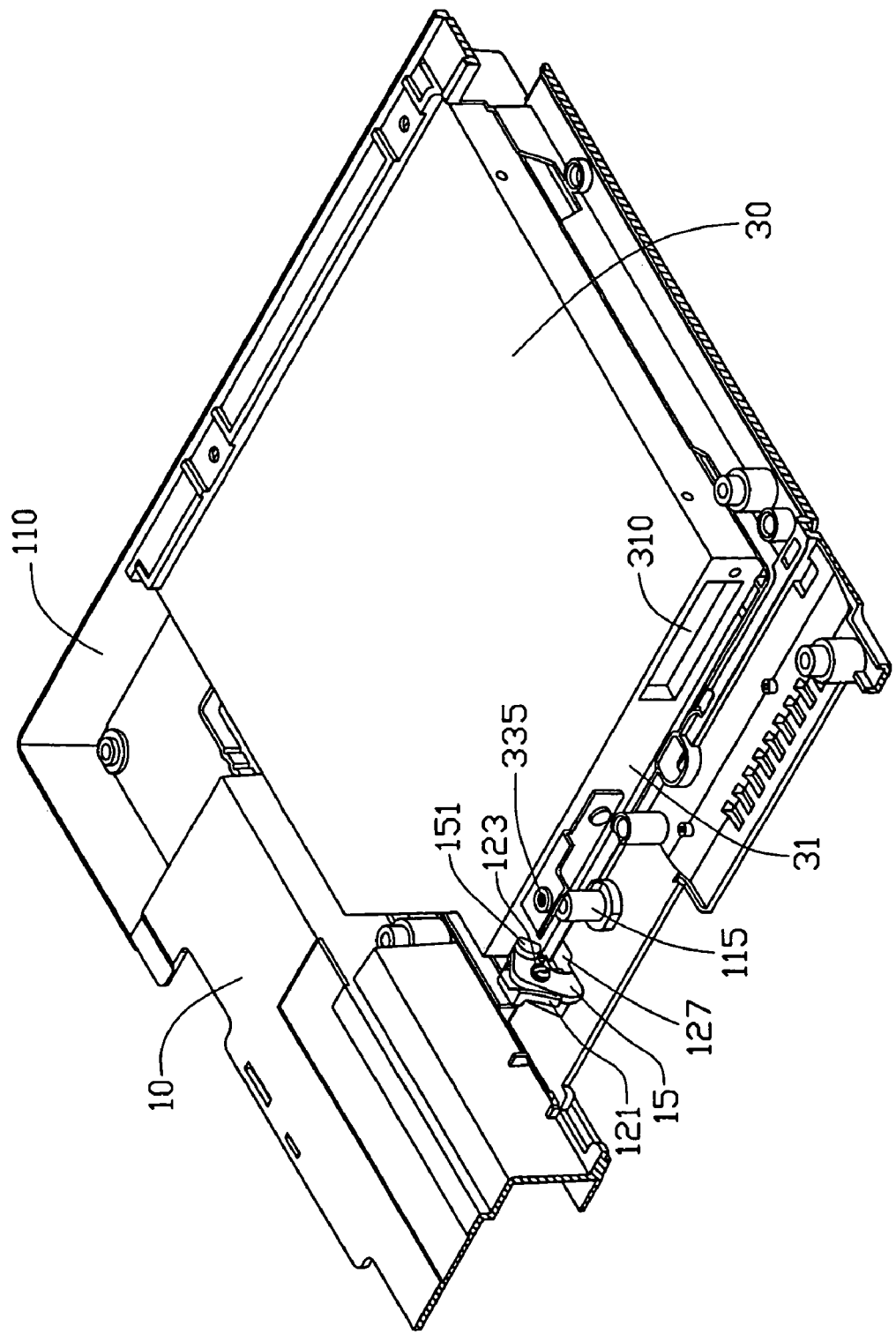
FIG. 4 is an assembled view of FIG. 1, showing the electronic module being pushed out.
Figure 5:
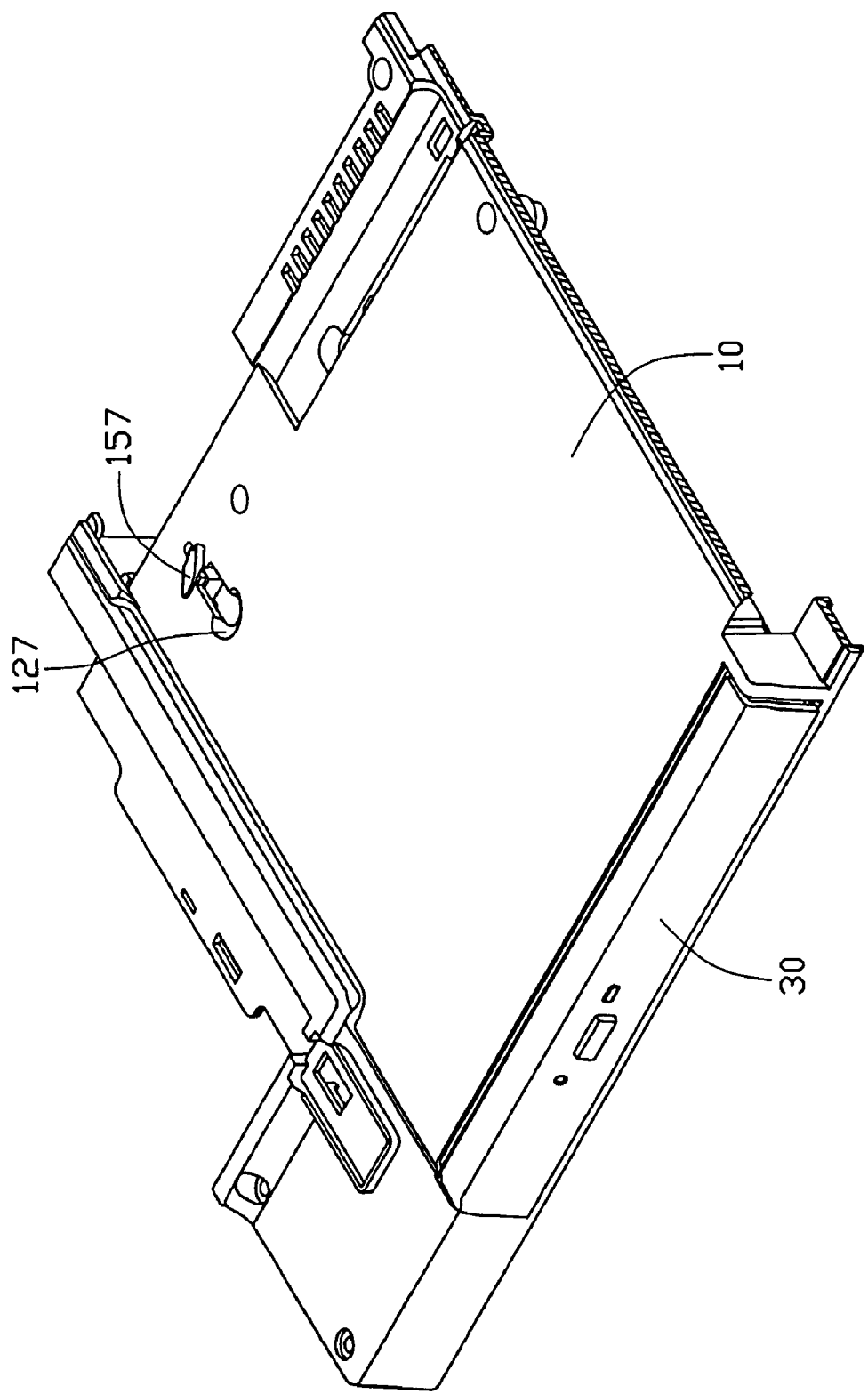
FIG. 5 is an inverted view of FIG. 4.

Referring also to FIGS. 4 and 5, in detaching the electronic module 30, the screw 50 is unscrewed from the securing hole 335 of the fixing plate 33. The manipulating section 157 is turned to rotate the pushing member 15 around the installing post 123 of the installing portion 12. The resilient tab 121 of the installing portion 12 is bending by the press of the flange 155 of the pushing member 15. The pushing portion 151 of the pushing member 15 pushes the electronic module 30 sliding forward. Therefore, the connecter 310 is pulled out and the electronic module 30 is pulled out a certain distance to facilitate being taken out from the notebook computer enclosure 10. When the external force exerted on the manipulating section 157 of the pushing member 15 is canceled, the pushing member 15 rotates back via the restoring force of the resilient tab 121.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

We claim:

1. A pushing assembly for pushing an electronic module out of a computer enclosure without opening the computer enclosure, the pushing assembly comprising:
   an installing portion arranged in the computer enclosure; and
   a pushing member pivotally installed to the installing portion, a manipulating section formed on the pushing member and received in and exposed to outside through a slot of the computer enclosure, the manipulating section turned to rotate the pushing member, and the pushing member pushing the electronic module to slide a certain distance to facilitate the electronic module being taken out from the computer enclosure, wherein a cantilevered resilient tab extends downward from a top of a lateral side surface of the installing portion, and the resilient tab abuts against a flange of the pushing member to keep the pushing member at a certain state.

2. The pushing assembly as claimed in claim 1, wherein the electronic module comprises a rear wall, and a pushing portion of the pushing member abuts against and pushes the rear wall to slide the electronic module.

3. The pushing assembly as claimed in claim 1, wherein an installing post protrudes from the installing portion, an installing hole is defined in the body of the pushing member, the installing post of the installing portion extends through the installing hole of the pushing member to pivotally install the pushing member to the computer enclosure.

4. The pushing assembly as claimed in claim 1, wherein the computer enclosure comprises a bottom panel, the installing portion is arranged in the bottom panel, and the slot is defined in the bottom panel.

5. The pushing assembly as claimed in claim 4, wherein a plurality of sliding rails is formed on the bottom panel to reduce friction when the electronic module slides into or out of the computer enclosure.

6. The pushing assembly as claimed in claim 1, wherein the computer enclosure comprises a side panel, an opening is defined in the side panel for entry of the electronic module.

7. The pushing assembly as claimed in claim 1, wherein a fixing plate is mounted to the electronic module, and the electronic module is attached to the computer enclosure by the fixing plate.

8. The pushing assembly as claimed in claim 7, wherein a securing hole is defined in the fixing plate, a positioning post with a round hole protrudes from the computer enclosure, a screw extends through the round hole of the positioning post then engages in the securing hole of the fixing plate, thus the electronic module is attached to the computer enclosure.

9. A pushing assembly for pushing an electronic module out of an enclosure of an electronic device, the pushing assembly comprising:
   an installing portion arranged in an inner side of the enclosure; and
   a pushing member pivotally installed to the installing portion, a pushing portion extending from the pushing member, and the pushing portion abutting against and pushing a rear wall of the electronic module moving a certain distance to facilitate the electronic module being taken out from the enclosure, wherein a cantilevered resilient tab extends downward from a top of a lateral side surface of the installing portion, and the resilient tab abuts against a flange of the pushing member to keep the pushing member at a certain state.

10. The pushing assembly as claimed in claim 9, wherein the enclosure comprises a bottom panel, a slot is defined through the bottom panel, a manipulating section is formed on the pushing member and received in the slot of the bottom panel, and the manipulating section is turned to rotate the pushing member.

11. The pushing assembly as claimed in claim 9, wherein an installing post protrudes from the installing portion, an installing hole is defined in the body of the pushing member, the installing post of the installing portion extends through the installing hole of the pushing member to pivotally install the pushing member to the enclosure.

12. The pushing assembly as claimed in claim 9, wherein the enclosure comprises a side panel, an opening is defined in the side panel for entry of the electronic module.

13. The pushing assembly as claimed in claim 9, wherein the electronic module comprises a connecter at the rear wall thereof to connect with the electronic device.

14. An electronic device comprising:
   an enclosure of said electronic device defining a space therein, an opening definable along a side panel of said enclosure to be spatially communicable with said space, the enclosure comprising a bottom panel, and a slot defined through the bottom panel;
   an electronic module installable in said space of said enclosure to function for said electronic device by means of moving into said space through said opening; and
   a pushing member installable in said enclosure beside said space, and rotatable about an axis extending differently from a moving direction of said electronic module into said space, rotation of said pushing member about said axis urging movement of said installed electronic module in said space to expose a portion of said electronic module outside said space of said enclosure through said opening, wherein a manipulating section is formed on the pushing member and received in the slot of the bottom panel, and the manipulating section is turned to rotate the pushing member, said pushing member is installable to an installing portion extending from said enclosure beside said space, a cantilevered resilient tab extends downward from a top of a lateral side surface of the installing portion to control said rotation of said pushing member.

15. The electronic device as claimed in claim 14, wherein said axis for said rotation of said pushing member is perpendicular to said moving direction of said electronic module.

* * * * *